(12) United States Patent
Bardini et al.

(10) Patent No.: US 9,830,323 B2
(45) Date of Patent: Nov. 28, 2017

(54) METHOD AND SYSTEM FOR ARCHIVING DATA FROM A SOURCE DATABASE TO A TARGET DATABASE

(71) Applicant: SIEMENS AKTIENGESELLSCHAFT, Munich (DE)

(72) Inventors: Matteo Bardini, Genoa (IT); Andrea Boero, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 424 days.

(21) Appl. No.: 14/488,497

(22) Filed: Sep. 17, 2014

(65) Prior Publication Data

US 2015/0081642 A1 Mar. 19, 2015

(30) Foreign Application Priority Data

Sep. 17, 2013 (EP) .................................... 13184768

(51) Int. Cl.
*G06F 17/30* (2006.01)

(52) U.S. Cl.
CPC .. *G06F 17/30073* (2013.01); *G06F 17/30563* (2013.01)

(58) Field of Classification Search
CPC .................... G06F 17/30073; G06F 17/30563
USPC .......................... 707/661–673; 711/161, 162
See application file for complete search history.

(56) References Cited

U.S. PATENT DOCUMENTS

| | | | |
|---|---|---|---|
| 7,487,171 B2 | 2/2009 | Hsu et al. | |
| 7,548,898 B1 * | 6/2009 | Tarenskeen et al. | |
| 7,836,022 B2 * | 11/2010 | Gillespie | 707/661 |
| 7,917,494 B2 * | 3/2011 | Muller | 707/711 |
| 8,032,493 B2 * | 10/2011 | Gong | 707/661 |
| 2009/0240725 A1 * | 9/2009 | Curtis et al. | 707/103 R |
| 2010/0010967 A1 * | 1/2010 | Muller | 707/3 |

OTHER PUBLICATIONS

"Oracle Databae 12c", Oracle Database 12c: Full Transportable Export/Import, Jan. 2014, 12 Pages.*

* cited by examiner

*Primary Examiner* — Jean B Fleurantin
(74) *Attorney, Agent, or Firm* — Laurence Greenberg; Werner Stemer; Ralph Locher

(57) ABSTRACT

A method and a system for archiving data from a source database to a target database perform the following step: a) specifying the data being subject to the archiving operation in the source database; b) extracting the data genealogy of the specified data, thereby revealing the physical relations among tables of the specified data and/or arbitrary rules defined by an administrator in order to create a data tree of the specified data; c) executing an export/import operation of the specified data from the source database to the target database, thereby starting in a direction from the root of the data tree to the leaves of the data tree; and d) after the successful execution of the export/import operation, executing a delete operation in the source database for the specified data, thereby starting in a direction of the leaves of the data tree to the root of the data tree.

6 Claims, 1 Drawing Sheet

METHOD AND SYSTEM FOR ARCHIVING DATA FROM A SOURCE DATABASE TO A TARGET DATABASE

CROSS-REFERENCE TO RELATED APPLICATION

This application claims the priority, under 35 U.S.C. §119, to European patent application EP 13184768.3, filed Sep. 17, 2013; the prior application is herewith incorporated by reference in its entirety.

BACKGROUND OF THE INVENTION

Field of the Invention

The present invention relates to a method and a system for archiving data from a source database to a target database.

A prior art method and system for storing data identities in a database structure, for example, in the database structure of an SQL server, includes storing value in the fields of a table having several records. The fields may be of various data types such as char, varchar, nvarchar, decimal, integer, real, and the like. Each data type has its own size which can be predetermined or variable. For example, 'varchar', 'nvarchar' data type is adapted to store value with variable size, while 'char', 'decimal', 'integer' data type store values with fixed size.

In this respect, a database management system (DBMS) allocates memory space of non-constant size for the fields having the data-type 'nvarchar'. In some known implementation, for avoiding memory waste caused by using fields with constant size, the database management system allocates dynamically different size of the memory space, depending on the size of actual data to be stored, for instance depending on an application writing and reading the database.

However, a problem permanently existing in an industrial environment of a manufacturing execution system (MES) is the problem of inserting/merging data between different databases which are subject to physical and/or logical and/or application-caused constraints relating to the data persistency. In fact, in those scenarios a raw copy of the data identities between two databases would not achieve the desired result of a merged database because the existing constraints would not be adapted accordingly and any foreign key relations would not be preserved.

The same criticality applies to the archiving of data stemming for example from an industrial process. Also for this task, the problem of preserving data inconsistency during the archiving process is still hard to be resolved when considering also possible database engine limits. Further, it is often required that the archiving is executable as scheduled transfer operation which will divide the archiving operation into an arbitrary number of time-frames.

Another not less critical problem is the performance of the archiving operation since the transfer of large amounts of data usually has a non-linear behavior increasing with the amount of data to be archived. This is valid all the more for the archiving of hierarchical elements (i.e. elements characterized by father/child relations). Moreover, it is often required that the transfer and archive operation have to be associated with the deletion of the transferred data in the source database. In this case, caused by the intrinsic nature of the most popular database engine architectures, a specific procedure would be desirable locking only very few data tables each during the archiving in order to avoid a block of the source database operation thereby harming for example the execution of a production process managed by an MES environment.

For dealing with these challenges in data transfer operations, usually a backup approach is used while each database engine usually provides a simple backup/restore utility for this purpose. Starting from a source database, a portion of the data (or the database in its entirety) can be moved into a selected target destination. Unfortunately, these operations are performed without considering possible physical relations, such as foreign key relations or logical and application relations. Furthermore, if there are table hierarchies present in the source database, these approaches known in the prior art do not consider these table hierarchies but require the database administrator to specify all the tables involving such hierarchies whose data is required to be transferred. Moreover, these approaches often delete the previous data or require specific blank tables in order to avoid possible data collisions and transfer errors.

And last but not least, the option to subdivide the transfer operation in many time-frames thereby only locking few data tables is only manually achievable or requires the definition of an ad hoc SQL procedure which simply calls the backup functionalities for each specified time frame. Unfortunately, also this approach is still lacking the solution of the data consistency problem.

SUMMARY OF THE INVENTION

It is accordingly an object of the invention to provide a method and system which overcome the disadvantages of the heretofore-known devices of this general type and which provide for a method and a system for archiving data from a source database to a target database which are able to deal with large amounts of data, maintain the data consistencies in terms of the physical and logical relations among the data tables and solve the locking and data deletion satisfactorily with respect to the accessibility of the database for the data management of the running production process.

With these and other objects in view there is provided, in accordance with the invention, a method for archiving data from a source database to a target database, comprising the steps of:

a) specifying the data being subject to the archiving operation in the source database;

b) extracting the data genealogy of the specified data, thereby revealing the physical relations among tables of the specified data and/or arbitrary rules defined by an administrator in order to create a data tree of the specified data;

c) executing an export/import operation of the specified data from the source database to the target database, thereby starting in a direction from the root of the data tree to the leaves of the data tree; and d) after the successful execution of the export/import operation, executing a delete operation in the source database for the specified data, thereby starting in a direction of the leaves of the data tree to the root of the data tree.

With respect to the system, the objects of the invention are achieved according to the present invention by a system for archiving data from a source database to a target database, comprising:

means for specifying the data being subject to the archiving operation in the source database;

a recursive algorithm for extracting the data genealogy of the specified data, thereby revealing the physical relations among tables of the specified data and/or arbitrary rules defined by an administrator in order to create a data tree of the specified data;

a database engine for executing an export/import operation of the specified data from the source database to the target database, thereby starting in a direction from the root of the data tree to the leaves of the data tree; and after the successful execution of the export/import operation, the database engine for executing a delete operation in the source database for the specified data, thereby starting in a direction of the leaves of the data tree to the root of the data tree.

Therefore, the present invention enables the handling of large of amount of data and solves—due to the structure identified with the data tree of the specified data—the problem of the downtime of at least parts of the source database and the target database. The identification of the genealogy of the specified data thereby guarantees the consistency of the data and the maintenance of the physical and/or logical relations of the specified data. The concept of the execution of the data transfer operation according to the data tree further creates the opportunity to start first with a root element of the specified and them proceed to the leaf element of the specified data.

In order to keep the downtime and the data tables locked as low as possible, the export/import operation may be executed in various discrete steps. Herein, a discrete step may comprise the data transfer of just a single table or the data transfer of just a distinct level of elements in the data tree or the data transfer of just each element in the data tree one after the other. Analogously, the deleting operation may be executed in various discrete steps. This measure allows enables very short downtime of only very limited parts of the source database which is otherwise in more or less permanent use of the data management for example of an MES controlled production process of goods in a plant (goods, such as food and beverage, cars, discrete parts, pharmaceuticals, gasoline, petroleum and other hydrocarbons and etc.). Accordingly, the specified data may be grouped in partitions enabling to transfer one partition, such as grouped as a logical partition according to the data tree, after the other.

A further preferred embodiment of the present invention may provide for an export/import operation that may be scheduled stepwise thereby only locking the records currently being subject in the respective step of the export/import operation. This measure locks the tables of the source database involved in the transfer operation only to a minimal amount of time. Further, the scheduling offers the option of using predictively some time windows for the transfer operation where the usage of the source database by the data management of the production process is rather low according to the experience made according to the production schedule.

Other features which are considered as characteristic for the invention are set forth in the appended claims.

Although the invention is illustrated and described herein as embodied in a method and a system for archiving data from a source database to a target database, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
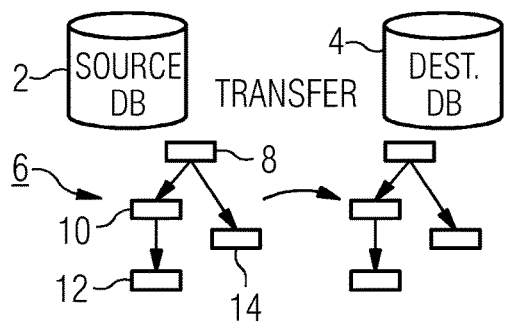
FIG. 1A is a schematic illustrating a step of the data transfer operation in order to archive data from a source database to a target database.
Figure 1B:
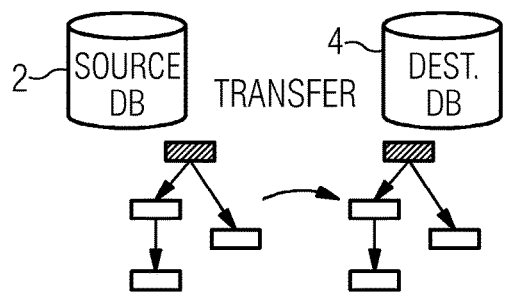
FIG. 1B of the drawing is a schematic illustrating a further step of the data transfer operation in order to archive data from a source database to a target database.
Figure 1C:
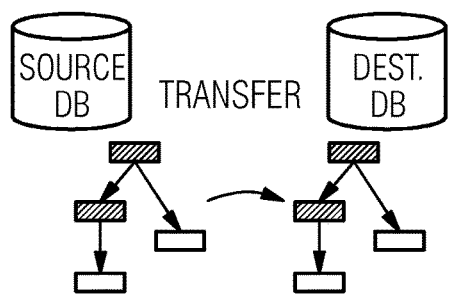
FIG. 1C of the drawing is a schematic illustrating a further step of the data transfer operation in order to archive data from a source database to a target database.
Figure 1D:
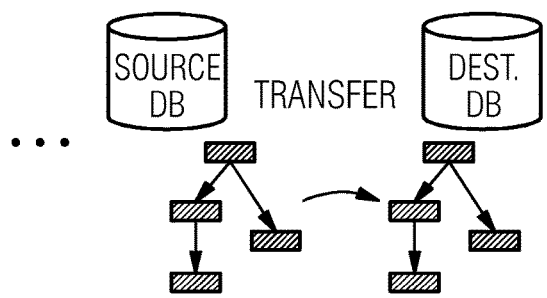
FIG. 1D of the drawing is a schematic illustrating a further step of the data transfer operation in order to archive data from a source database to a target database.
Figure 1E:
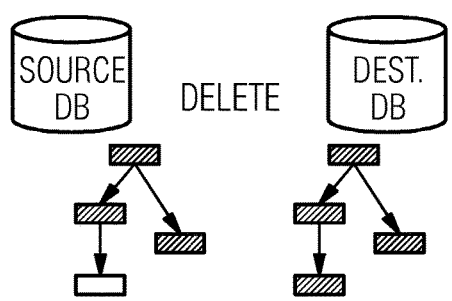
FIG. 1E of the drawing is a schematic illustrating a further step of the data transfer operation in order to archive data from a source database to a target database.
Figure 1F:
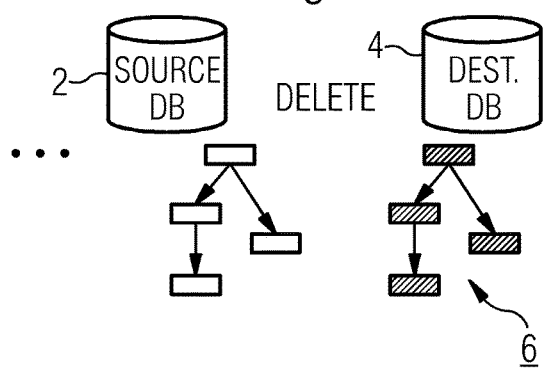
FIG. 1F of the drawing is a schematic illustrating a further step of the data transfer operation in order to archive data from a source database to a target database.

The accompanying drawing which is included to provide a further understanding of the disclosure and is incorporated in and constitutes a part of this application illustrates preferred but not limiting embodiment(s) of the disclosure. They serve to explain the principle of the disclosure together with the description.

Referring now to the figure of the drawing in detail, initially to the archiving operation a database administrator has to specify which data of a source database 2 have to be exported for the archiving operation into a target database 4. This specification can be done rather by a filtering criterion than by a particular column, i.e., the database administrator can specify that, for instance, a daily transfer of the material historian of the production process can be foreseen at a distinct or flexible point of time even during the time while the production is still running.

Once this data is specified—hereinafter referred to as specified data—a recursive algorithm is executed by the database engine of the source database 2 in order to identify the genealogy of the specified data which shall be represented by a data tree 6 in the figure at step 1). This genealogy comprises all physical and logical relations related to the specified data and is eventually deduced as the data tree 6. This data tree 6 comprises diverse levels in the hierarchy of the data tree 6, such as a root level, a trunk level and diverse leaf levels of different hierarchical levels. In the present example of the figure, the data tree 6 comprises a root level 8, a trunk level 10 and two leaf levels 12, 14 at different hierarchical levels. To each of these diverse levels 8 to 14 of the data tree 6, a certain partition of the specified data is assigned (i.e., in other words, the genealogy of the specified data leads to the respective hierarchical structure of the diverse levels in the data tree 6).

Under step 2) in the figure, the first partition of the specified data has been subject to the import/export operation from the source database 2 to the target database 4. This partition relates to the specified data in the root level 8 of the data tree 6. This shall be illustrated by hatched boxes in the data trees 6 for both the source database 2 and the destination database 4. Therefore, a locking on both databases 2, 4 is only necessary for the data tables of the specified data related to this root level 8 leading to a short dead time of those data tables due to the limited amount of data comprised in this partition as compared to the total amount of the specified data.

Under step 3) in the figure, a second partition of the specified data present in the trunk level 10 of the data tree 6 is exported into the target database 6 as shown by the hatched boxes in the figure. Further steps 3a) and 3b) which are not shown in the figure are executed subsequently for the partitions of the specified data which are related to the two different hierarchies related to the leaf levels 12, 14. The result of all these export/import operations is shown in step 4) of the figure. Here, all boxes in the data trees 6 are in a hatched design representing on the side of the source database 2 that all specified data is still present there but has also been successfully exported to the target database 4 and on the side of the target database 4 that all specified data has been imported successfully. Therefore, the archiving operation starting with the partition of the specified data having the highest hierarchy level (root level 8) and ending with the partition of the specified data having the lowest hierarchy level (leaf level 12) is now completed except for the deletion of the specified data in the source database 2.

Step 5) in the figure now represents the deletion of the first partition of the specified data now having the lowest hierarchy level (leaf level 12). In steps 5a), 5b) and 5c) which are not illustrated in the figure, also the other partitions are deleted in the sequence of the related hierarchy level in the data tree 6 as seen in the direction from the remaining lowest hierarchy level to the highest hierarchy level (leaf level 14 in step 5a, trunk level 10 in step 5b and root level 8 in step 5c). The deleting operation is therefore executed exactly opposite to the sequence in the export operation. Step 6) in the figure therefore represents the completion of the entire archiving operation what is indicated by the hatched boxes in the data tree 6 in the destination database 4.

Therefore, the present invention enables the handling of even large of amounts of the specified data and solves—due to the structure identified with the data tree 6 of the specified data—the problem of the downtime of at least parts of the source database 2 and the target database 4. The identification of the genealogy of the specified data thereby guarantees the consistency of the data and the maintenance of the physical and/or logical relations of the specified data. The concept of the execution of the data transfer operation according to the data tree further creates the opportunity to start first with a root element of the specified and them proceed to the leaf element of the specified data when exporting data and execute the deletion operation in the source database 2 just along the opposite direction starting with the leaf element (leaf level with lowest hierarchy level) and ending with the root level (highest hierarchy level).

The invention claimed is:

1. A computer implemented method of archiving data from a source database to a target database, the method comprising the following steps:
   a) specifying the data being subject to the archiving operation in the source database to define specified data;
   b) extracting a data genealogy of the specified data, thereby revealing physical relations among tables of information selected from the group consisting of the specified data and arbitrary rules defined by an administrator in order to create a data tree of the specified data;
   c) executing an export or import operation of the specified data from the source database to the target database, thereby starting in a direction from a root of the data tree to leaves of the data tree;
   d) after the successful execution of the export or import operation, executing a delete operation in the source database for the specified data, thereby starting in a direction of the leaves of the data tree to the root of the data tree; and
   e) scheduling the export or import operation stepwise and thereby only locking records that are currently subject in a respective step of the export or import operation.

2. The method according to claim 1, which comprises executing the delete operation by deleting in various discrete steps.

3. The method according to claim 1, which comprises grouping the specified data in partitions.

4. A system for archiving data from a source database to a target database,
   the system comprising:
   a) a processor configured to process a recursive algorithm for extracting a data genealogy of specified data, to thereby reveal physical relations among tables of information selected from the group consisting of the specified data and arbitrary rules defined by an administrator in order to create a data tree of the specified data, the data tree having a hierarchy with a root and with leaves, wherein the specified data is data subject to an archiving operation in the source database;
   b) a device for exporting data from the source database and a device for importing data to the source database, said device for exporting and said device for importing being configured to execute an export or import operation of the specified data from the source database to the target database, and thereby starting the export or import operation in a direction from a root of the data tree to the leaves of the data tree; and
   c) a device associated with the source database and configured, after a successful execution of the export or import operation, to execute a delete operation in the source database for the specified data, thereby starting in a direction of the leaves of the data tree to the root of the data tree;
   wherein said device for exporting data and said device for importing data are configured to execute the export or import operation stepwise, thereby only locking records that are currently subject to a respective step of the export or import operation.

5. The system according to claim 4, wherein the device for deleting is configured to execute the delete operation in various discrete steps.

6. The system according to claim 4, wherein the specifying means is configured to group the specified data in partitions.

* * * * *